United States Patent [19]

Satoji

[11] Patent Number: 4,978,463

[45] Date of Patent: Dec. 18, 1990

[54] LUBRICATING RUBBER COMPOSITION

[75] Inventor: Fuminori Satoji, Kuwana, Japan

[73] Assignee: NTN-Rulon Industries, Co., Ltd., Tokyo, Japan

[21] Appl. No.: 304,290

[22] Filed: Jan. 31, 1989

[30] Foreign Application Priority Data

Feb. 2, 1988 [JP]   Japan .................. 63-23424

[51] Int. Cl.$^5$ ................ C10M 107/40; C10M 107/54
[52] U.S. Cl. ...................................... 252/12; 252/43; 252/58
[58] Field of Search ..................... 252/43, 12, 12.2, 58

[56] References Cited

U.S. PATENT DOCUMENTS

| | | | |
|---|---|---|---|
| 3,344,064 | 9/1967 | Brady et al. | 252/12 |
| 3,808,129 | 4/1974 | Lindlof et al. | 252/12 |
| 4,787,991 | 11/1988 | Morozumi et al. | 252/25 |
| 4,808,323 | 2/1989 | Fisher et al. | 252/54 |

FOREIGN PATENT DOCUMENTS

| | | | |
|---|---|---|---|
| 0005527 | 1/1983 | Japan | 252/43 |
| 1111333 | 5/1986 | Japan | 252/43 |

*Primary Examiner*—Jacqueline V. Howard
*Attorney, Agent, or Firm*—Armstrong, Nikaido, Marmelstein, Kubovcik & Murray

[57] ABSTRACT

A rubber composition made of a diene rubber having such excellent properties as heat resistance and mechanical strength and organopolysiloxane or fluoropolymer as a lubricating substance. The lubricating substance may contain isocyanate or cyanate groups, which will react with the hydroxy groups which exist on the surface of a filler usually applied to the diene rubber, thus securely keeping the lubricating substance in the molecular structure of the composition. A liquid diene polymer containing hydroxy groups and having a good compatibility with the diene rubber may be further added to the composition so that its hydroxy groups will react with the isocyanate or cyanate groups in the lubricating substance.

The liquid diene polymer may contain epoxy groups instead of hydroxy groups, whereas the lubricating substance containing such functional groups as amino, carboxyl, hydroxy or mercapto groups so that the exoxy groups in the former and the functional groups in the latter will react with each other. The composition may further contain an isocyanate compound containing isocyanate groups, with the liquid diene polymer containing hydroxy groups. In this arrangement, the hydroxy groups in the liquid diene polymer will be replaced with the isocyanate groups, which in turn will react with the functional groups in the lubricating substance.

8 Claims, No Drawings

LUBRICATING RUBBER COMPOSITION

The present invention relates to a lubricating rubber composition.

In view of its excellent oil resistance, wear resistance, elasticity and mechanical strength, diene rubbers have been used in many fields, e.g. for oil seals, window seals, dust boots of universal joints, valves, toner seals and the like. But if such a rubber is used as sliding parts in machines and automobiles having high performance and high speed, it is required to have better lubricating properties. If a rubber composition is applied to a device normally used indoors, e.g. information processing machines such as copying machines, printers, facsimile machines and computers, it is required to have not only excellent sliding properties but also a function to absorb the noises which tend to produce when these devices operate. Further, if such rubber compositions are to be used for sliding parts in optical devices using a semiconductor laser such as compact disc players, video disc players and an optical file, they are required to have not only excellent lubricating properties but also vibration-damping properties to allow a laser beam to be focused by a condenser lens right on the surface of the disk in the devices, thereby allowing them to properly read the bit information on the disk.

To meet these requirements, various trials have been made, e.g. the use of a synthetic resin having good sliding properties such as polyamide, polyacetal, polyolefin or fluorocarbon resin or the mixing of an elastomer in such resins. But it is frequent not to make the best use of good properties peculiar to rubber such as sealing, followability, vibration-damping and noise-damping properties. On the other hand, prior art diene rubber compositions have rather poor sliding properties. Thus, they tend to require a larger driving force or cause frictional sounds or a stick slip. Furthermore, after a prolonged use, they might cause the frictional resistance to increase, the wear to progressively grow and the heat accumulation to increase. This might cause the rubber material itself to deform.

Various methods have been proposed to reduce the frictional resistance of a sliding part comprising rubber, such as laminating a fluorocarbon resin film (hereinafter referred to as the laminating method) as disclosed in Japanese Patent Publication No. 46-23681, heat-fusing an olefin resin (heat-fusing method) as disclosed in Japanese Patent Publication No. 57-32950, applying to the substrate a liquid made up of an organic solvent having a film-forming polymer dissolved therein and having a solid lubricant such as fluorocarbon resin dispersed therein and baking them together (coating method), and mixing a solid lubricant such as fluorocarbon resin or a lubricating oil such as silicone oil separately or simultaneously into a rubber material (mixing method).

But all these methods have problems one way or another. Namely, with the laminating method and the heat-fusing method, it is difficult to bond a fluorocarbon resin film or an olefin resin film to the substrate. Particularly with a fluorocarbon resin film it is necessary to treat its surface with an alkaline metal or by ion sputtering. Still, its bond properties are not sufficient. So, these films tend to peel off the substrate very often and thus cannot be applied to a molded article having a complicated configuration. Further, because these films are rather thick, they might have a bad influence on various good properties peculiar to rubber such as sealing property, followability and vibration-damping property.

As far as the bond properties are concerned, the coating method would be superior to the lamination and heat-fusing methods. But since the liquid applied to the substrate contains polymers having no lubricating properties, the material obtained has an insufficient lubricating property.

With the mixing method, if the amount of the solid lubricant is insufficient, the lubricating properties will scarecely reveal, whereas if its amount is excessive, various good properties of the rubber material will be deteriorated. With this method, a lubricating oil is mixed so as to improve the lubricating properties of the material by causing the oil to ooze out on the surface of the material while it is in frictional engagement with another material. But the coefficient of friction does not stabilize at a lower level and the lubricating oil tends to ooze out excessively as the temperature rises. Further this method has various other problems. For example, with this method, it is difficult to mold the substrate; the lubricating oil tends to separate when molding or kneading, thus hampering various properties of the substrate; dust tends to stick to the sliding surface covered with the lubricating oil; the material tends to get worn abnormally if the oil runs out.

It is an object of the present invention to provide a lubricating rubber composition which can stably exhibit the coefficient of friction at a low level without impairing the properties intrinsic to rubber such as sealing property, followability or noise-damping and vibration-damping properties and which can be used for a sliding part which is required to have a low coefficient of friction.

In accordance with the first embodiment of the present invention, there is provided a lubricating rubber composition comprising: a diene rubber; and one selected from the group consisting of organopolysiloxane and fluoropolymer, the one having at least one group selected from the group consisting of isocyanate group and cyanate group.

In accordance with the second embodiment of the present invention, there is provided a lubricating rubber composition comprising: a diene rubber; a liquid diene polymer having a unit having an epoxy group; and one selected from the group consisting of organopolysiloxane and fluoropolymer, the one having a unit having at least one group selected from the group consisting of amino, carboxyl, hydroxy and mercapto groups.

In accordance with the third embodiment of the present invention, there is provided a lubricating rubber composition comprising: a diene rubber; a liquid diene polymer having at least two units each having a hydoxy group in one molecule; an isocyanate compound having at least two units each having an isocyanate group in one molecule; and one selected from the group consisting of organopolysiloxane and fluoropolymer having a unit containing at least one group selected from the group consisting of amino, carboxyl, hydroxy and mercapto groups.

The diene rubber used in the present invention is made by polymerizing or copolymerizing diene monomers. It may be natural rubber or a synthetic rubber such as butadiene rubber, isopropylene rubber, chloroprene rubber, styrene-butadiene rubber, and acrylonitrile-butadiene rubber.

The organopolysiloxane used in the present invention may be a polymer or copolymer of organopolysyloxane such as dimethyl siloxane, methylphenyl siloxane, and trimethyl fluoropropylsiloxane, having isocyanate or cyanate groups added thereto.

The following are some examples:
organopolysiloxane containing isocyanate groups

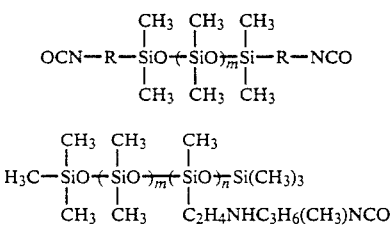

organopolysiloxane containing cyanate groups

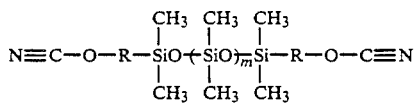

(wherein R designates an alkylene group, $m=5-10000$, $n=2-100$)

The fluoropolymer used in the present invention may be made by introducing isocyanate and/or cyanate groups into a polyfluoroalkyl or a polyfluoroether. The polyfluoroalkyl may be a polymer having polyfluoroalkyl groups each having 2-20 carbons. For example, it may be one of the following polymers:

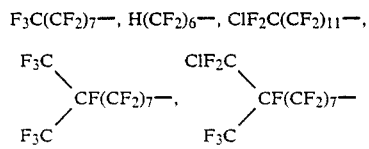

The polyfluoroether may be a polymer having a primary structural unit of $CxF2X-O-$ (wherein X is 1, 2, 3 or 4) and having an average molecular weight of 500-50000. Shown below are some examples.

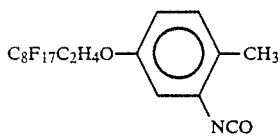

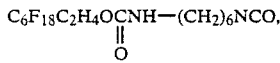

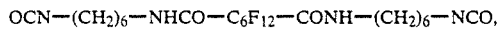

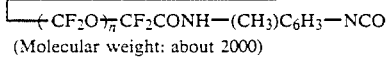

(Molecular weight: about 2000)

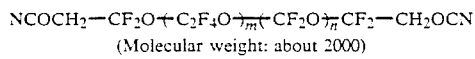

(Molecular weight: about 2000)

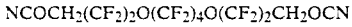

The liquid diene polymer containing hydroxy groups used in the present invention is made by polymerizing or copolymerizing diene monomers. Its molecular weight should be 500-50000, preferably 500-10000. The content of the hydroxy group should be 0.1-10.0 meq/g. The diene polymer should be in a liquid form at normal temperatures The liquid diene polymer may be butadiene homopolymer, isoprene homopolymer, butadiene-styrene copolymer, butadiene-isoprene copolymer, butadiene-acrylonitrile copolymer, butadiene-2-ethylhexyl acrylate copolymer and butadiene-n-octadecyl acrylate copolymer.

The liquid diene polymer containing epoxy groups used in the present invention is made by polymerizing or copolymerizing diene monomers. Its molecular weight should be 500-50000, preferably 500-10000. The epoxy groups should preferably be present at ends of each molecular structure. Their epoxy equivalent weight should be 100-50000 and preferably be 250-5000. The diene polymer should be in a liquid form at normal temperatures. The liquid diene polymer may be butadiene homopolymer, isoprene homopolymer, butadiene-styrene copolymer, butadiene-isoprene copolymer, butadiene-acylonitrile copolymer, butadiene-2-ethylhexyl acrylate copolymer and butadiene-n-octadecyl acrylate copolymer.

The isocyanate compound used in the present invention may be a known aliphatic, alicyclic or aromatic isocyanate having at least two units each containing an isocyanate group. For example, it may be selected from the following compounds having a formula shown below:

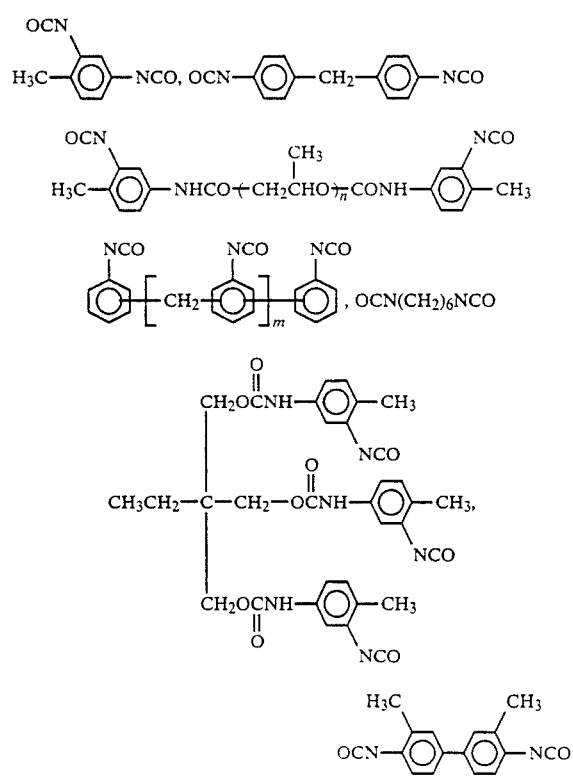

The organopolysiloxane used in the present invention may be a polymer or copolymer of organopolysyloxane such as dimethyl siloxane, methylphenyl siloxane, and trimethyl fluoropropylsiloxane, having amino, carboxyl, hydroxy or mercapto groups added thereto.

The following are some examples:
organopolysyloxane containing amino groups

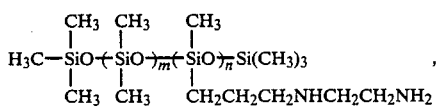

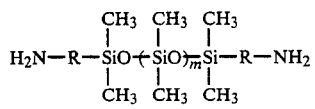

organopolysiloxane containing carboxyl groups

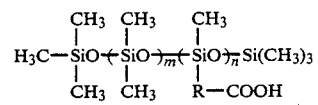

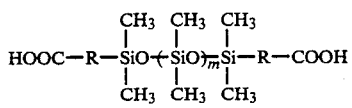

organopolysiloxane containing hydroxy groups

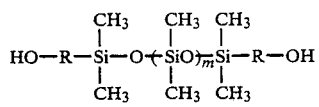

organopolysiloxane containing mercapt groups

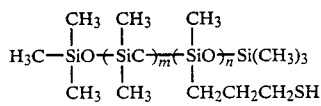

(wherein R designates an alkylene group, m=5-10000, n=2-100)

The fluoropolymer used in the present invention may be made by introducing amino, carboxyl, hydroxy or mercapto groups into a polyfluoroalkyl or a polyfluoroether. The polyfluoroalkyl may be a polymer having polyfluoroalkyl groups each having 2-20 carbons. For example, it may be one of the following polymers:

$F_3C(CF_2)_7-$, $H(CF_2)_6-$, $ClF_2C(CF_2)_{11}-$,

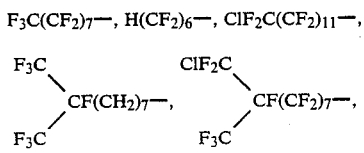

The polyfluoroether may be a polymer having a primary structural unit of $C_xF_{2x}$-O- (wherein X is 1, 2, 3 or 4) and having an average molecular weight of 500-50000. Shown below are some examples.

$C_6F_{13}COOH$, $C_8F_{17}C_2H_4OH$, $C_8F_{17}C_2H_4SH$, $C_6F_{13}SCH_2CH_2OCO(CH_2)_5NH_2$, $C_{10}F_{21}CONHC_2H_4OH$,

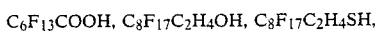

-continued

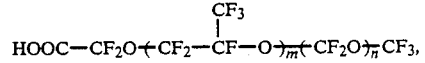

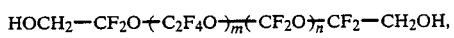

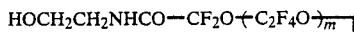
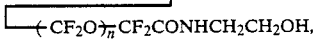

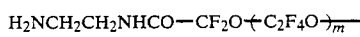
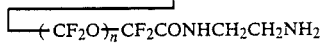

It is preferable to use an ordinary vulcanizing agent for rubber to vulcanize the diene rubber and the liquid diene polymer according to the present invention. The vulcanizing agent is not limited but may be a sulfide or an organic peroxide, for example The agent is very effective to control the reaction rate of not only the crosslinking between the molecules of the diene rubber and the crosslinking between the molecules of the liquid diene polymer but also the co-crosslinking between the diene rubber and the liquid diene polymer.

The rubber composition according to the present invention has excellent lubricating properties while keeping virtually intact the mechanical properties intrinsic to rubber.

In the first embodiment of the present invention, it is not apparent why only isocyanate and cyanate groups can have particularly favorable effects in producing a rubber compound having excellent lubricating properties from diene rubber and organopolysiloxane or a fluoropolymer. But this is presumably because isocyanate or cyanate groups, which have a good reactivity with hydroxy groups, react with active hydroxy groups which exist on the surface of a filler usually applied to a diene rubber, such as carbon black, silica, clay, kaolinite or mica, thus securely keeping the lubricating substance on the surface of the filler This will prevent the so-called bleedout during formation and allow the rubber compound to maintain its excellent lubricating properties over a long period The same is true for liquid diene polymers The isocyanate or cyanate groups in the organopolysiloxane or fluoropolymer will react partially or completely with the hydroxy groups in the liquid diene polymer, thus forming a strong bond.

In the second embodiment of the present invention, this is presumably because active functional groups (epoxy groups) in the liquid diene polymer react partially or completely with functional groups (amino, carboxyl, hydroxy, or mercapto groups) in the organopolysiloxane or fluoropolymer having good lubricating properties, thus forming a strong bond.

In the third embodiment of the present invention, this is presumably because active functional groups (isocyanate groups) produced by the reaction between the hydroxy groups in the liquid diene polymer and the isocianate compound react partially or completely with functional groups (amino, carboxyl, hydroxy, or mercapto groups) in the organopolysiloxane or fluoropolymer having good lubricating properties, thus forming a strong bond Owing to a good compatibility between diene rubber and liquid diene polymer, the latter is uniformly dispersed in the structure of diene rubber. Thus, the organopolysiloxane or fluoropolymer, too, is uniformly dispersed in diene rubber because they are comfined with the liquid diene polymer.

Thus, the organopolysiloxane or fluoropolymer in the composition is less liable to get out of position even if the composition is subjected to a stress such as a shearing force or a compressive force and heat generated by friction and their lubricating properties can be kept for a longer period of time without the fear of causing any bad influence on excellent properties such as heat resistance and mechanical strength which are intrinsic to the rubber material mainly composed of diene ingredients.

The organopolysiloxane and the fluoropolymer should preferably have functional groups arranged at both ends of each unit instead of at one end only so as to increase the number of reaction points. This will allow part of the networking structure of diene rubber to be replaced with the molecules of organopolysiloxane or fluoropolymer molecules, so that lubricating polymers will occupy more surface area, thus improving the lubricating properties and wear resistance of the composition.

In the first embodiment of the present invention, the content of the organopolysiloxane or fluoropolymer should preferably be 3-100 parts by weight to 100 parts by weight of diene rubber. If it is less than 3 parts by weight, no apparent improvement in the lubricating properties would be expected. If more than 100 parts by weight, the mechanical strength of the diene rubber will drop considerably.

The sum of contents of the organopolysiloxane or fluoropolymer and the liquid diene polymers should be 5-100 parts by weight in relation to 100 parts by weight of the diene rubber. If it is less than 5 parts by weight, the lubricating properties would be insufficient and if over 100 parts, the mechanical strength of the rubber composition will decrease remarkably.

Although the ratio of the liquid diene rubber to the organopolysiloxane or fluoropolymer is not specifically limited, in order to assure the effect of the present invention, the content of the liquid diene rubber should preferably be determined so that its hydroxy groups will have an amount equivalent to the chemical equivalent of the isocyanate or cyanate groups in the organopolysiloxane or fluoropolymer.

In the second ebodiment of the present invention, the sum of contents of the organopolysiloxane or fluoropolymer and the liquid diene polymers should be 5-100 parts by weight in relation to 100 parts by weight of the diene rubber. If it is less than 5 parts by weight, the lubricating properties would be insufficient and if over 100 parts, the mechanical strength of the rubber composition will decrease remarkably.

Although the ratio of the liquid diene rubber to the organopolysiloxane or fluoropolymer is not specifically limited, in order to assure the effect of the present invention, the content of the liquid diene polymer should preferably be determined so that its epoxy equivalent amount will be equivalent to the chemical equivalent amount of the functional groups (amino, carboxyl, hydroxy or mercapto groups) in the organopolysiloxane or fluoropolymer.

In the third embodiment of the present invention, the content of the liquid diene polymer having hydroxy groups to the isocyanate compound should be such that the molar ratio of isocyanate group to hydroxy group will be at least more than 1 and preferably 2-10 to allow part or preferably all of the hydroxy groups in the liquid diene polymer to be replaced with isocyanate groups and thus to cause the latter to react with the functional groups in the organopolysiloxane or fluoropolymer. If the ratio is over 10, an excessive free isocyanate compound which does not react with the liquid diene polymer may have a bad effect on the lubricating properties of the rubber composition.

The liquid diene polymer having hydroxy groups may be replaced partially with a so-called polyol, which has at least two hydroxy groups in each molecule, such as ethylene glycole, 1,4-butanediol. The "partially" means such an extent as not to cause any bad influence on the properties of the composition of the present invention, e.g. 20 parts by weight or less in relation to 100 parts by weight of liquid diene polymer. In such a case, the molar ratio of the isocyanate groups to the hydroxy groups should be more than 1, taking into account the hydroxy groups in the polyol. Although the ratio of the liquid diene rubber to the organopolysiloxane or fluoropolymer is not specifically limited, in order to assure the effect of the present invention, the content of the organopolysiloxane or fluoropolymer should preferaly be determined so that its functional groups will have an amount equivalent to that of the isocyanate groups in the liquid diene polymer replaced with the isocyanate groups in the isocyanate compound.

The sum of contents of the organopolysiloxane or fluoropolymer, the isocyanate compound and the liquid diene polymers should be 5-100 parts by weight in relation to 100 parts by weight of the diene rubber. If it is less than 5 parts by weight, the lubricating properties would be insufficient and if over 100 parts, the mechanical strength of the rubber composition will decrease remarkably.

The content of the rubber vulcanizing agent added to crosslink the diene rubber and the liquid diene polymer should be determined according to the contents and types of the diene substances used and the type of vulcanizing agent used. It should generally be 0.1-20 parts by weight.

The lubricating rubber composition according to the present invention may contain, if necessary, a filler usually used in the rubber industry (such as carbon black, silica, clay, calcium carbonate, magnesium carbonate, magnesium hydrooxide, aluminum hydroxide, aluminum oxide, talc, mica, kaolinite, bentonite, Japanese white clay, silicon carbide, aramide resin and phenolic resin in the form of powder or short fiber), a vulcanization assistant (such as zinc oxide and aliphatic acid), a vulcanization accelerator (such as guanidines, sulfides or aldehydeamines), a stabilizer (such as zinc stearate, lead phosphite and barium phoshite), a plasticizer (such as dimethyl phthalate and dioctyl phthalate), an age resistor (such as amines or phenols), an antioxidant (2,6-di-butyl-p-cresol), an ultraviolet absorbing agent (such as an acryl nitrile derivative), a fire retardant (such as antimony oxide and zircon oxide) and a coloring agent (such as cadmium yellow, phthalocyanine blue and titanium white).

The abovesaid starting materials may be mixed in a conventional manner. For example, by use of an open roll mill, Banbury mixer or kneader, all the components may be kneaded together with a rubber vulcanizing agent and other additives all at once.

However, in the first embodiment of the present invention, to effectively react the hydroxy groups in the liquid diene polymer with the isocyanate or cyanate groups in the organopolysiloxane or fluoropolymer, only these main materials may be kneaded together and then the other materials may be added. Further, the organopolysiloxane or fluoropolymer may be supplied into the kneader in a solution form after dissolving it in a solvent such as fluorochlorohydrocarbon to improve its dispersion properties.

In the second embodiment of the present invention, when blending the liquid diene polymer, it is preferable to mix and react it solely with the organopolysiloxane or fluoropolymer so that its epoxy groups will react completely with the functional groups in the latter, and then add the diene rubber and the other substances. Further, the organopolysiloxane or fluoropolymer may be supplied into the kneader in a solution form after dissolving it in a solvent such as fluorochlorohydrocarbon to improve its dispersion properties.

In the third embodiment of the present invention, it is preferable to react the isocyanate compound with the liquid diene polymer having hydroxy groups and polyols to form a prepolymer of liquid diene polymer having units containing isocyante groups, and then add an organopolysiloxane or a fluoropolymer. This is because if the abovesaid substances were kneaded all at once, the isocyanate compound might react selectively with the functional groups in the organosiloxane or fluoropolymer, so that the lubricating ingredients will be unevenly present in the composition of the present invention.

The compounds thus mixed and kneaded are molded by means of a press, calender, extruder or rubber injection molder and vulcanized into a final product.

In the first embodiment of the present invention, the functional groups (such as amino, carboxyl, hydroxy and mercapto groups) in the organopolysiloxane or fluoropolymer having excellent lubricating properties react with and bonded strongly to the diene rubber and the additives which coexist therewith. Further, if the liquid diene polymer is used, the crosslinking between the liquid diene polymers themselves and co-crosslinking between the liquid diene polymer and the diene rubber will serve to strongly hold the lubricating substances in the rubber composition.

In the second embodiemnt of the present invention, the functional groups (such as amino, carboxyl, hydroxy and mercapto groups) in the organopolysiloxane or fluoropolymer having excellent lubricating properties react with and are bonded strongly to the hydroxy groups in the liquid diene polymer. Further, the crosslinking between the liquid diene polymers themselves and co-crosslinking between the liquid diene polymer and the diene rubber will serve to strongly hold the lubricating substances in the rubber composition.

In the third embodiment of the present invention, the functional groups (such as amino, carboxyl, hydroxy and mercapto groups) in the organopolysiloxane or fluoropolymer having excellent lubricating properties react with and are bonded strongly to the functional groups (isocyanate groups) in the liquid diene polymer having isocyanate groups derived from hydroxy groups. Further, the crosslinking between the liquid diene polymers themselves and co-crosslinking between the liquid diene polymer and the diene rubber will serve to strongly hold the lubricating substances in the rubber composition.

As a result, the composition thus made will stably exhibit low coefficient of friction and high wear resistance for a longer period of time. Further, good compatibility between the diene rubber and the liquid diene polymer will allow the latter to be well dispersed uniformly in the former. This will allow the lubricating substances (i.e. the organopolysiloxane or fluoropolymer bonded to the diene polymers) to be dispersed uniformly as fine units in the rubber composition, thus giving the composition low coefficient of friction and high wear resistance without imparing excellent mechanical strength and heat resistance which are intrinsic to the rubber substrate.

Since the rubber composition according to the present invention has not only excellent sealing properties, adaptability to deformation and vibration-damping and noise-damping properties which are attributable to the diene rubber material in the composition, but also excellent lubricating properties, it exhibits high stability and high reliability in use with sliding movement for a prolonged time. Thus, the rubber composition according to the present invention will find its applications to various kinds of machines and devices such as automobiles, office equipment, information-processing and communication devices, automatic control devices, aero- and space-apparatus and devices, medical devices, electrical and electronic devices and general industrial machinery. Above all, the composition according to the present invention can be advantageously used as a feed roller, toner seal, toner blade, silencer gear for a copying machine, a kneading roller used in the food industry, a packing in a faucet, a guide shoe for an elevator, a joint dust boot, safety pad, and wiper blade for use in an automobile, shock absorbing materials, valves and oil seals.

The materials used in the following Examples and Comparison Examples are as follows (wherein the letters in brackets are abbreviations; the contents are expressed in parts by weight):

(A) Diene rubber
1. Acrylonitrile-butadiene rubber [NBR] (Japan Synthetic Rubber Co., Ltd. : JSR237H),
2. Styrene-butadiene rubber [SBR] (Japan Synthetic Rubber Co., Ltd. : JSR1502),
3. Chloroprene rubber [CR] (Toyo Soda Manufacturing Co. B-11), (B) Liquid diene polymer
4. Liquid diene polymer containing hydroxy groups [HO-PB] (Idemitsu Petro Chemical Co., Ltd. : polybutadiene containing hydroxy groups at end R-45HT, molecular weight: about 2800, equivalent weight of the hydroxy groups: 1250),
5. Liquid diene polymer containing epoxy groups [EPOX-PB] (Idemitsu Petro Chemical Co., Ltd. : polybutadiene containing epoxy groups at ends R-45EPT, molecular weight: about 3000, equivalent weight of the epoxy groups: 1450),
6. Liquid diene polymer not containing functional groups [LNBR] (Japan Synthetic Rubber Co., Ltd. : JSR N-280, Acrylonitrile content: 32 per cent), (C) Organopolysiloxane
7. Organopolysiloxane containing isocyanate groups [OCN-SIL] (NTN-Rulon Industries, Co., Ltd. : silicone oil containing isocyanate groups at both ends obtained by mixing 56 grams of silicone oil X22-160C having a molecular weight of 5600 and 3.5 grams of 2,4-tolylene diisocyanate and stirring for one hour at room temperature,
8. Organopolysiloxane containing epoxy groups [EP-SIL] (Shin-Etsu Chemical Industries Co., Ltd. : epoxidized silicone oil KF102 epoxy equivalent weight: 4000)

9. Organopolysiloxane containing carboxyl groups [HOOC-SIL-1] (Shin-Etsu Chemical Industriers Co., Ltd. : carboxylated silicone oil X22-3701E),
10. Organopolysiloxane containing unfunctional groups [SIL] (Shin-Etsu Chemical Industries Co., Ltd. : silicone oil KF96 3000),
11. Organopolysiloxane containing carboxyl groups [HOOC-SIL-2] (Shin-Etsu Chemical Industries Co., Ltd. : carboxylated silicone oil X22-3710, equivalent weight of carboxyl groups: 1250),
12. Organopolysiloxane containing hydroxy groups [HO-SIL] (Shin-Etsu Chemical Industries Co., Ltd. : silicone oil having hydroxy groups at both ends X-22-160C, equivalent weight of hydroxy groups 2800),
13. Organopolysiloxane containing amino groups [$H_2N$-SIL] (Shin-Etsu Chemical Industries Co., Ltd. : silicone oil having hydroxy groups at both ends X-22-161C, equivalent weight of amine: 3800), (D) Fluoropolymer
14. Polyfluoroether containing isocyanate groups [OCN-FCO] (Montefluos in Italy: Fomblin Z DISOC-2000, molecular weight: 2000)
15. Polyfluoroalkyl containing isocyanate groups [OCN-FC]
16. Polyfluoroalkyl containing cyanate groups [NCO-FC]
17. Polyfluoroalkyl containing epoxy groups [EP-FC]
18. Polyfluoroalkyl containing amino groups [$H_2N$-FC]
19. Polyfluoroalkyl containing epoxy groups [EPOX-FC]
20. Polyfluoroether containing hydroxy groups [HO-FCO](Montefluos in Italy: Fomblin Z DOL-2000, molecular weight: 2000)
21. Polyfluoroether containing carboxyl groups [HOOC-FCO] (Montefluos in Italy : Fomblin Z DIACID-2000, molecular weight: 2000)
22. Polyfluoroether containing unfunctional groups [FCO] (Montefluos in Italy : FOMBLIN Z 25, Molecular Weight: About 15000)
23. Polyfluoroalkyl containing hydroxy groups [HO-FC]
24. Polyfluoroalkyl containing mercapto groups [HS-FC]

(E) Polyols:
25. Ethylene glycol (F) Catalyst:
26. Dibutyltin Dilaurate [cata-1],
27. N, N-dimethylbenzylamine [cata-2]
28. Tertiary amine (N, N-dimethylbenzilamine)

(G) Additives:
29. Carbon [C-1] (Asahi Carbon Co., Ltd. : HAF),
30. Carbon [C-2] (Asahi Carbon Co., Ltd. : FEF),
31. Carbon [C-3] (Asahi Carbon Co., Ltd. : SRF),
32. Magnesium oxide [MgO] (Kyowa Chemical Industry Co., Ltd.),
33. Talc (Nippon Talc Co., Ltd.),
34. Calcium Carbonate (Shiraishi Kogyo Co., Ltd.),
35. Light calsium carbonate (Shiraishi Kogyo Co., Ltd.),
36. Sulfur (Hosoi Chemical Industry Co., Ltd.),
37. Zinc white [vulcanizing assistant-1] (Mitsui Mining & Smelting Co., Ltd.),
38. Stearic acid [vulcanizing assistant-2]
39. N-cyclohexyl-2-benzothiazorile sulfenamide [vulcanization accelerator-1] (Ouchi Shinko Chemical Industry Co., Ltd.),
40. Tetramethylthiuram disulfide [vulcanization accelerator-2] (Ouchi Shinko Chemical Industry Co., Ltd.)
41. Dioctyl phthalate [DOP] (Kurogane Kasei Co., Ltd.),
42. Wax age resistor [age resistor-1] (Ouchi Shinko Chmeical Co., Ltd.),
43. 6-ethoxy-1,2-dihydro-2,2,4-trimethylquinoline [age resistor-2] (Ouchi Shinko Chemical Industry Co., Ltd.), (H) Isocyanate compound
44. Trilanediisocyanate [TDI]

EXAMPLES 1-8

Tables 1 and 2 show the contents of the diene rubber, organopolysiloxane containing isocyanate groups, fluoropolymer containing isocyanate or cyanate groups, and the other additives. These materials were mixed and sufficiently kneaded in an open roll mill. Then the composition thus obtained was pressed at a temperature of 170° C. for five minutes and molded into vulcanized rubber plates 150 mm long, 150 mm wide and 2 mm thick. The plates were tested for tensile strength, tensile elongation and hardness (JIS-A) according to JIS-K6301. Also, to evaluate their lubricating properties, the plates were brought into frictional contact with a bearing steel (SUJ2) under the surface pressure of 3 kg/cm$^2$ at a speed of 1 m/min. to measure the coefficient of friction by use of a thrust type frictional wear tester. The results are shown in Table 3.

EXAMPLES 9-17

Tables 4 and 5 show the materials used in Examples 9-17 and their contents. These Examples differ from Examples 1-8 only in that liquid diene polymer containing hydroxy groups is used. Plate-shaped specimens were prepared in the same manner as in Examples 1-8. The specimens were tested in the same manner as in Examples 1-8. The results are shown in Table 6.

COMPARISON EXAMPLES 1-16

Tables 7 to 10 show the materials used in Comparison Examples 1-16 and their contents Plate-shaped specimens in Comparison Eamples 1 and 4-16 were prepared in the same manner as in Example 1 and specimens in Comparison Examples 2 and 3 were made in the same manner as in Examples 6 and 7, respectively. The specimens were tested in the same manner as in Examples 1-17. The results are shown in Tables 11 and 12.

By comparing Tables 3 and 6 which show the test results of Examples 1-8 and Examples 9-17, respectively, with Tables 11 and 12 which show the test results of Comparison Examples 1-8 and 9-17, respectively, it will be apparent that the specimens in Examples 1-17 show lower coefficients of friction than the specimens in Comparison Examples. Particularly, the specimens in Examples 9-17 in which a liquid diene copolymer containing hydroxy groups was used showed much lower coefficients of friction. This will be clearly understood by comparing the test results of Examples 2, 3 and 4 with those of Comparison Examples 10, 11 and 12, respectively.

It will also become apparent by comparing the results of Example 2 with those of Examples 1, 3, 4 and 5 or by comparing the results of Example 11 with Examples 10 and 13 that if the contents of the organopolysiloxane or fluoroplymer as a lubricating agent are the same, polyfluoroether is the most effective substance in improving the lubricating properties of the rubber composition. Further, the specimens in Examples 1–17 show a very high mechanical strength in spite of the fact that they contain a lubricating ingredient such as organopolysiloxane or fluoropolymer. For example, the specimens in Examples 1–5 and 8 which contain a lubricating ingredient and the specimens in Examples 9–13, 16 and 17 which further contain a liquid diene polymer all showed higher mechanical strength than the specimen in Comparison Example 1 which is an NBR composition. Of the abovementioned specimens, the one in Example 8 shows the lowest mechanical strength, because it contains a lubricating ingredient in a rather large amount, i.e. 70 parts by weight. Still its mechanical strength is sufficiently high. Namely, its tensile strength is 85 per cent, tensile elongation is 85 per cent and hardness is 94 per cent.

In contrast, the specimens in Comparison Examples 1–3 which contain no organopolysiloxane or fluoropolymer, and the specimens in Comparison Examples 6, 7, 9, 10, 11, 14, 15 and 16 which contain organopolysiloxane or fluoropolymer having other functional groups than those used in the present invention all showed rather high coefficients of friction. The specimen in Comparison Example 5 in which the lubricating ingredients as used in the present invention were used but its content exceeded 70 parts by weight and the specimen in Comparison Example 13 which contain a liquid diene polymer having no hydroxy groups showed poor mechanical strength, though the coefficients of friction were small. Also, the specimens in Comparison Examples 8 and 12 which contain organopolysiloxane or fluoropolymer having no functional groups also showed insufficient mechanical strength, though the coefficients of frictions were small.

EXAMPLES 18–30

Tables 13 and 14 show the substances used in Examples 18 to 30 and their contents (parts by weight). The materials were mixed and sufficiently kneaded in an open roll mill. The rubber compositions thus obtained were subjected to press vulcanization at a temperature of 170° C. for five minutes and molded into plates 150 mm long, 150 mm wide and 2 mm thick. The plates were tested for tensile strength, tensile elongation and hardness (JIS-A) according to JIS-K6301. Also, to evaluate their lubricating c properties, the plates were brought into frictional contact with a bearing steel (SUJ2) under the surface pressure of 3 kg/cm$^2$ at a speed of 1 m/min. to measure the coefficient of friction by use of a thrust type frictional wear tester. The results are shown in Table 15.

COMPARISON EXAMPLES 17–27

Tables 16 and 17 show the substances used in Comparison Examples 17 to 27 and their contents. In Comparison Examples 17 and 20–27, plate-shaped specimens were prepared in the same manner as in Examples 1. In Comparison Examples 18 and 19, plate-shaped specimens were made in the same manner as in Examples 23 and 24, respectively. The specimens were tested in the same manner as in Examples 1. The results are shown in Table 18.

By comparing Table 15 with Table 18, it will be apparent that the specimens in Examples 18–30 show lower friction coefficient than the specimens in Comparison Examples. The specimens which contain polyfluoroether (Examples 22, 25 and 26) showed particularly lower coefficients of friction compared with those in Examples 19, 20, 21, 27 and 28. Also, the specimens in Examples 18–30 keep high mechanical strength in spite of the fact that they contain lubricating substances such as organopolysiloxane or fluoropolymer. In contrast, the specimens in Comparison Exmaples 17 to 19 which contain no organopolysiloxane or fluoropolymer and no liquid diene polymer, the specimens in Comparison Examples 21 and 22 which contain different liquid diene polymers from those used in the present invention, the specimens in Comparison Examples 23 and 24 which contain liquid diene polymer containing different functional groups from those used in the present invention, and the specimen in Comparison Example 25 which contains a lubricating ingredient having the same functional groups as used in the present invention but contains no liquid diene polymer according to the present invention all showed higher coefficients of friction than the specimens in Examples 18 to 30.

Also, the specimen in Comparison Example 20 in which the same lubricating ingredient and liquid diene polymer as used in the present invention were used but the sum of their contents exceed 100 parts by weight and the specimens in Comparison Examples 26 and 27 which contain a lubricating ingredient having unfunctional groups, showed poor mechanical strength, though the coefficients of friction were small. In conclusion, all the Comparison Examples were inferior to any of the Examples 18–30.

EXAMPLES 31–41

Tables 19 and 20 show the substances used in Examples 31 to 41 and their contents. The materials other than the lubricating ingredients, i.e. organopolysiloxane or fluoropolymer, were mixed and sufficiently kneaded in an open roll mill. Then the lubricating ingredients were added thereto and kneaded. The rubber compositions thus obtained were subjected to press vulcanization at a temperature of 170° C. for five minutes and molded into plates 150 mm long, 150 mm wide and 2 mm thick. The plates were tested for tensile strength, tensile elongation and hardness (JIS-A) according to JIS-K6301. Also, to evaluate their lubricating properties, the plates were brought into frictional contact with a bearing steel (SUJ2) under the surface pressure of 3 kg/cm$^2$ at a speed of 1 m/min. to measure the coefficient of friction by use of a thrust type frictional wear tester The results are shown in Table 21.

COMPARISON EXAMPLES 28–36

Tables 22 and 23 show the substances used in Comparison Examples 28 to 36 and their contents. Plate-shaped specimens were prepared in the same manner as in Examples 31–41. The specimens were tested in the same manner as in Examples 31–41. The results are shown in Table 24.

By comparing Table 21 with Table 24, it will be apparent that the specimens in Examples 31–41 show lower friction coefficient than the specimens in Comparison Examples. Also, they keep high mechanical strength in spite of the fact that they contain lubricating substances such as organopolysiloxane or fluoropolymer. In contrast, the specimens in Comparison Examples 28 to 30 which contain no organosiloxane or fluoropolymer and no liquid diene polymer, the specimen in Comparison Example 34 which contains a different kind of liquid diene polymer from those used in the present invention, and the specimens in Comparison Examples 35 and 36 which contain no liquid diene polymers, showed higher coefficients of friction than the specimens in Examples 31 to 41. Also, the specimen in Comparison Example 31 in which the same lubricating ingredient and liquid diene polymer as used in the present invention were used but the sum of their contents exceed 100 parts by weight and the specimens in Comparison Examples 32 and 33 which contain a lubricating ingredient having unfunctional groups, showed poor mechanical strength, though the coefficients of friction were small In conclusion, all the Comparison Examples were inferior to any of the Examples 31–41.

TABLE 1

| Material | | 1 | 2 | 3 | 4 | 5 | 6 | 7 | 8 |
|---|---|---|---|---|---|---|---|---|---|
| Diene rubber | (1) | 100 | 100 | 100 | 100 | 100 | — | — | 100 |
| | (2) | — | — | — | — | — | 100 | — | — |
| | (3) | — | — | — | — | — | — | 100 | — |
| Organopoly-siloxane | (7) | — | 20 | — | — | — | — | — | — |
| Fluoropolymer | (14) | 3 | — | 20 | — | — | 20 | 20 | 70 |
| | (15) | — | — | — | 20 | — | — | — | — |
| | (16) | — | — | — | — | 20 | — | — | — |
| Catalyst | (26) | 0.03 | 0.2 | 0.2 | 0.2 | 0.2 | 0.2 | 0.2 | 0.7 |

TABLE 2

| Additive | | 1 | 2 | 3 | 4 | 5 | 6 | 7 | 8 |
|---|---|---|---|---|---|---|---|---|---|
| Filler | (29) | 40 | 40 | 40 | 40 | 40 | — | 30 | 40 |
| | (30) | — | — | — | — | — | — | 30 | — |
| | (31) | — | — | — | — | — | 30 | — | — |
| | (32) | — | — | — | — | — | — | 4 | — |
| | (33) | 35 | 35 | 35 | 35 | 35 | — | — | 35 |
| | (34) | — | — | — | — | — | 50 | — | — |
| | (35) | — | — | — | — | — | 50 | — | — |
| Vulcanizer | (36) | 0.3 | 0.3 | 0.3 | 0.3 | 0.3 | 1.8 | — | 0.3 |
| Vulcanization assistant | (37) | 5 | 5 | 5 | 5 | 5 | 5 | 5 | 5 |
| | (38) | 1 | 1 | 1 | 1 | 1 | 1 | 1 | 1 |
| Vulcanization accelerator | (39) | 2 | 2 | 2 | 2 | 2 | 1.3 | 1 | 2 |
| | (40) | 2 | 2 | 2 | 2 | 2 | 0.5 | — | 2 |
| Plasticizer | (41) | 7 | 7 | 7 | 7 | 7 | 30 | 20 | 7 |
| Age resistor | (42) | 1.5 | 1.5 | 1.5 | 1.5 | 1.5 | 1.5 | 2 | 1.5 |
| | (43) | — | — | — | — | — | — | 2.5 | — |

TABLE 3

| Measuring item | 1 | 2 | 3 | 4 | 5 | 6 | 7 | 8 |
|---|---|---|---|---|---|---|---|---|
| Tensile break strength (kg/cm$^2$) | 185 | 170 | 150 | 145 | 140 | 80 | 115 | 135 |
| Tensile break elongation (%) | 500 | 460 | 490 | 440 | 490 | 610 | 350 | 430 |
| Hardness JIS-A | 68 | 65 | 67 | 66 | 66 | 49 | 68 | 64 |
| Friction coefficient | 0.88 | 0.75 | 0.65 | 0.79 | 0.80 | 0.78 | 0.67 | 0.50 |

TABLE 4

| Material | | 9 | 10 | 11 | 12 | 13 | 14 | 15 | 16 | 17 |
|---|---|---|---|---|---|---|---|---|---|---|
| Diene rubber | (1) | 100 | 100 | 100 | 100 | 100 | — | — | 100 | 100 |
| | (2) | — | — | — | — | — | 100 | — | — | — |
| | (3) | — | — | — | — | — | — | 100 | — | — |
| Liquid diene polymer | (4) | 3.8 | 8.4 | 25.0 | 41.8 | 85.9 | 25.0 | 25.0 | 12.5 | 50.0 |
| Organopoly-siloxane | (7) | — | 20 | — | — | — | — | — | — | — |
| Fluoropolymer | (14) | 3 | — | 20 | — | — | 20 | 20 | 20 | 20 |
| | (15) | — | — | — | 20 | — | — | — | — | — |
| | (16) | — | — | — | — | 9 | — | — | — | — |
| Catalyst | (26) | 0.03 | 0.2 | 0.2 | 0.2 | 0.09 | 0.2 | 0.2 | 0.2 | 0.2 |

TABLE 5

| Additive | | 9 | 10 | 11 | 12 | 13 | 14 | 15 | 16 | 17 |
|---|---|---|---|---|---|---|---|---|---|---|
| Filler | (29) | 40 | 40 | 40 | 40 | 40 | — | 30 | 40 | 40 |
| | (30) | — | — | — | — | — | — | 30 | — | — |
| | (31) | — | — | — | — | — | 30 | — | — | — |
| | (32) | — | — | — | — | — | — | 4 | — | — |
| | (33) | 35 | 35 | 35 | 35 | 35 | — | — | 35 | 35 |
| | (34) | — | — | — | — | — | 50 | — | — | — |

TABLE 5-continued

| Additive | | 9 | 10 | 11 | 12 | 13 | 14 | 15 | 16 | 17 |
|---|---|---|---|---|---|---|---|---|---|---|
| | (35) | — | — | — | — | — | 50 | — | — | — |
| Vulcanizer | (36) | 0.3 | 0.3 | 0.3 | 0.3 | 0.3 | 1.8 | — | 0.3 | 0.3 |
| Vulcanization | (37) | 5 | 5 | 5 | 5 | 5 | 5 | 5 | 5 | 5 |
| assistant | (38) | 1 | 1 | 1 | 1 | 1 | 1 | 1 | 1 | 1 |
| Vulcanization | (39) | 2 | 2 | 2 | 2 | 2 | 1.3 | 1 | 2 | 2 |
| accelerator | (40) | 2 | 2 | 2 | 2 | 2 | 0.5 | — | 2 | 2 |
| Plasticizer | (41) | 7 | 7 | 7 | 7 | 7 | 30 | 20 | 7 | 7 |
| Age resistor | (42) | 1.5 | 1.5 | 1.5 | 1.5 | 1.5 | 1.5 | 2 | 1.5 | 1.5 |
| | (43) | — | — | — | — | — | — | 2.5 | — | — |

TABLE 6

| Measuring item | 9 | 10 | 11 | 12 | 13 | 14 | 15 | 16 | 17 |
|---|---|---|---|---|---|---|---|---|---|
| Tensile break strength (kg/cm$^2$) | 185 | 175 | 170 | 155 | 175 | 85 | 125 | 175 | 165 |
| Tensile break elongation (%) | 505 | 480 | 450 | 460 | 490 | 605 | 345 | 450 | 470 |
| Hardness JIS-A | 68 | 66 | 66 | 66 | 67 | 49 | 69 | 66 | 67 |
| Friction coefficient | 0.70 | 0.45 | 0.33 | 0.50 | 0.65 | 0.47 | 0.39 | 0.37 | 0.45 |

TABLE 7

| Material | | 1 | 2 | 3 | 4 | 5 | 6 | 7 | 8 |
|---|---|---|---|---|---|---|---|---|---|
| Diene rubber | (1) | 100 | — | — | 100 | 100 | 100 | 100 | 100 |
| | (2) | — | 100 | — | — | — | — | — | — |
| | (3) | — | — | 100 | — | — | — | — | — |
| Liquid diene polymer | (4) | — | — | — | — | 95.4 | — | — | — |
| Organopolysiloxane | (8) | — | — | — | — | — | 20 | — | — |
| | (9) | — | — | — | — | — | — | 20 | — |
| | (10) | — | — | — | — | — | — | — | 20 |
| Fluoropolymer | (15) | — | — | — | 90 | — | — | — | — |
| | (16) | — | — | — | — | 10 | — | — | — |
| Catalyst | (26) | — | — | — | 0.9 | 0.1 | — | 0.2 | — |
| | (27) | — | — | — | — | — | 0.2 | — | — |

TABLE 8

| Additive | | 1 | 2 | 3 | 4 | 5 | 6 | 7 | 8 |
|---|---|---|---|---|---|---|---|---|---|
| Filler | (29) | 40 | — | 30 | 40 | 40 | 40 | 40 | 40 |
| | (30) | — | — | 30 | — | — | — | — | — |
| | (31) | — | 30 | — | — | — | — | — | — |
| | (32) | — | — | 4 | — | — | — | — | — |
| | (33) | 35 | — | — | 35 | 35 | 35 | 35 | 35 |
| | (34) | — | 50 | — | — | — | — | — | — |
| | (35) | — | 50 | — | — | — | — | — | — |
| Vulcanizer | (36) | 0.3 | 1.8 | — | 0.3 | 0.3 | 0.3 | 0.3 | 0.3 |
| Vulcanization | (37) | 5 | 5 | 5 | 5 | 5 | 5 | 5 | 5 |
| assistant | (38) | 1 | 1 | 1 | 1 | 1 | 1 | 1 | 1 |
| Vulcanization | (39) | 2 | 1.3 | 1 | 2 | 2 | 2 | 2 | 2 |
| accelerator | (40) | 2 | 0.5 | — | 2 | 2 | 2 | 2 | 2 |
| Plasticizer | (41) | 7 | 30 | 20 | 7 | 7 | 7 | 7 | 7 |
| Age resistor | (42) | 1.5 | 1.5 | 2 | 1.5 | 1.5 | 1.5 | 1.5 | 1.5 |
| | (43) | — | — | 2.5 | — | — | — | — | — |

TABLE 9

| Material | | 9 | 10 | 11 | 12 | 13 | 14 | 15 | 16 |
|---|---|---|---|---|---|---|---|---|---|
| Diene rubber | (1) | 100 | 100 | 100 | 100 | 100 | 100 | 100 | 100 |
| Liquid diene polymer | (4) | — | — | — | — | — | 6.3 | 49.4 | 25 |
| | (6) | — | — | — | — | 25 | — | — | — |
| Organopolysiloxane | (8) | — | — | — | — | — | 20 | — | — |

TABLE 9-continued

| Material | | Comparative example | | | | | | | |
|---|---|---|---|---|---|---|---|---|---|
| | | 9 | 10 | 11 | 12 | 13 | 14 | 15 | 16 |
| Fluoropolymer | (14) | — | — | — | — | 20 | — | — | — |
| | (17) | 20 | — | — | — | — | — | 20 | — |
| | (18) | — | 20 | — | — | — | — | — | — |
| | (20) | — | — | 20 | — | — | — | — | 20 |
| | (22) | — | — | — | 20 | — | — | — | — |
| Catalyst | (26) | — | 0.2 | 0.2 | — | — | — | — | 0.2 |
| | (27) | 0.2 | — | — | — | — | 0.2 | 0.2 | — |

TABLE 10

| Additive | | Comparative example | | | | | | | |
|---|---|---|---|---|---|---|---|---|---|
| | | 9 | 10 | 11 | 12 | 13 | 14 | 15 | 16 |
| Filler | (29) | 40 | 40 | 40 | 40 | 40 | 40 | 40 | 40 |
| | (33) | 35 | 35 | 35 | 35 | 35 | 35 | 35 | 35 |
| Vulcanizer | (36) | 0.3 | 0.3 | 0.3 | 0.3 | 0.3 | 0.3 | 0.3 | 0.3 |
| Vulcanization | (37) | 5 | 5 | 5 | 5 | 5 | 5 | 5 | 5 |
| assistant | (38) | 1 | 1 | 1 | 1 | 1 | 1 | 1 | 1 |
| Vulcanization | (39) | 2 | 2 | 2 | 2 | 2 | 2 | 2 | 2 |
| accelerator | (40) | 2 | 2 | 2 | 2 | 2 | 2 | 2 | 2 |
| Plasticizer | (41) | 7 | 7 | 7 | 7 | 7 | 7 | 7 | 7 |
| Age resistor | (42) | 1.5 | 1.5 | 1.5 | 1.5 | 1.5 | 1.5 | 1.5 | 1.5 |

TABLE 11

| Measuring item | Comparative example | | | | | | | |
|---|---|---|---|---|---|---|---|---|
| | 1 | 2 | 3 | 4 | 5 | 6 | 7 | 8 |
| Tensile break strength (kg/cm$^2$) | 190 | 90 | 135 | 40 | 90 | 160 | 155 | 90 |
| Tensile break elongation (%) | 505 | 620 | 355 | 250 | 290 | 440 | 440 | 330 |
| Hardness JIS-A | 68 | 50 | 70 | 57 | 61 | 62 | 62 | 60 |
| Friction coefficient | 1.30 | 1.48 | 1.25 | 0.62 | 0.95 | 1.33 | 1.35 | 0.82 |

TABLE 12

| Measuring item | Comparative example | | | | | | | |
|---|---|---|---|---|---|---|---|---|
| | 9 | 10 | 11 | 12 | 13 | 14 | 15 | 16 |
| Tensile break strength (kg/cm$^2$) | 145 | 140 | 140 | 95 | 95 | 145 | 135 | 140 |
| Tensile break elongation (%) | 430 | 435 | 410 | 310 | 290 | 390 | 415 | 420 |
| Hardness JIS-A | 62 | 62 | 62 | 60 | 60 | 62 | 62 | 63 |
| Friction coefficient | 1.35 | 1.20 | 1.27 | 0.75 | 0.95 | 1.35 | 1.37 | 1.26 |

TABLE 13

| Material | | Example | | | | | | | | | | | | |
|---|---|---|---|---|---|---|---|---|---|---|---|---|---|---|
| | | 18 | 19 | 20 | 21 | 22 | 23 | 24 | 25 | 26 | 27 | 28 | 29 | 30 |
| Diene rubber | (1) | 100 | 100 | 100 | 100 | 100 | — | — | 100 | 100 | 100 | 100 | 100 | 100 |
| | (2) | — | — | — | — | — | 100 | — | — | — | — | — | — | — |
| | (3) | — | — | — | — | — | — | 100 | — | — | — | — | — | — |
| Liquid diene polymer | (5) | 4.4 | 10.4 | 23.2 | 14.9 | 29 | 29 | 29 | 58 | 29 | 62.5 | 60.4 | 14.5 | 58 |
| Organopoly-siloxane | (12) | — | 20 | — | — | — | — | — | — | — | — | — | — | — |
| | (11) | — | — | 20 | — | — | — | — | — | — | — | — | — | — |
| | (13) | — | — | — | 20 | — | — | — | — | — | — | — | — | — |
| Fluoropolymer | (20) | 3 | — | — | — | 20 | 20 | 20 | 40 | — | — | — | — | — |
| | (21) | — | — | — | — | — | — | — | 20 | — | — | — | — | — |
| | (23) | — | — | — | — | — | — | — | — | — | 20 | — | — | — |
| | (24) | — | — | — | — | — | — | — | — | — | — | 20 | — | — |
| Catalyst | (28) | 0.03 | 0.2 | 0.2 | 0.2 | 0.2 | 0.2 | 0.2 | 0.2 | 0.2 | 0.2 | 0.2 | 0.2 | 0.2 |

TABLE 14

| Material | | Example 18 | 19 | 20 | 21 | 22 | 23 | 24 | 25 | 26 | 27 | 28 | 29 | 30 |
|---|---|---|---|---|---|---|---|---|---|---|---|---|---|---|
| Filler | (29) | 40 | 40 | 40 | 40 | 40 | — | 30 | 40 | 40 | 40 | 40 | 40 | 40 |
| | (30) | — | — | — | — | — | — | 30 | — | — | — | — | — | — |
| | (31) | — | — | — | — | — | 30 | — | — | — | — | — | — | — |
| | (32) | — | — | — | — | — | — | 4 | — | — | — | — | — | — |
| | (33) | 35 | 35 | 35 | 35 | 35 | — | — | 35 | 35 | 35 | 35 | 35 | 35 |
| | (34) | — | — | — | — | — | 50 | — | — | — | — | — | — | — |
| | (35) | — | — | — | — | — | 50 | — | — | — | — | — | — | — |
| Vulcanizer | (36) | 0.3 | 0.3 | 0.3 | 0.3 | 0.3 | 1.8 | — | 0.3 | 0.3 | 0.3 | 0.3 | 0.3 | 0.3 |
| Vulcanization assistant | (37) | 5 | 5 | 5 | 5 | 5 | 5 | 5 | 5 | 5 | 5 | — | 5 | 5 |
| | (38) | 1 | 1 | 1 | 1 | 1 | 1 | 1 | 1 | 1 | 1 | — | 1 | 1 |
| Vulcanization accelerator | (39) | 2 | 2 | 2 | 2 | 2 | 1.3 | 1 | 2 | 2 | 2 | — | 2 | 2 |
| | (40) | 2 | 2 | 2 | 2 | 2 | 0.5 | — | 2 | 2 | 2 | — | 2 | 2 |
| Plasticizer | (41) | 7 | 7 | 7 | 7 | 7 | 30 | 20 | 7 | 7 | 7 | — | 7 | 7 |
| Age resistor | (42) | 1.5 | 1.5 | 1.5 | 1.5 | 1.5 | 1.5 | 2 | 1.5 | 1.5 | 1.5 | — | 1.5 | 1.5 |
| | (43) | — | — | — | — | — | — | 2.5 | — | — | — | — | — | — |

TABLE 15

| Measuring item | Example 18 | 19 | 20 | 21 | 22 | 23 | 24 | 25 | 26 | 27 | 28 | 29 | 30 |
|---|---|---|---|---|---|---|---|---|---|---|---|---|---|
| Tensile break strength (kg/cm) | 185 | 165 | 170 | 165 | 160 | 80 | 120 | 150 | 165 | 160 | 165 | 170 | 165 |
| Tensile break elongation (%) | 500 | 410 | 430 | 430 | 410 | 600 | 310 | 400 | 430 | 435 | 440 | 470 | 455 |
| Hardness (JIS-A) | 69 | 67 | 67 | 67 | 67 | 49 | 68 | 6 | 67 | 67 | 67 | 66 | 67 |
| Friction coefficient | 0.83 | 0.70 | 0.70 | 0.75 | 0.58 | 0.73 | 0.69 | 0.49 | 0.61 | 9.79 | 0.81 | 0.61 | 0.65 |

TABLE 16

| Material | | Comparative example 17 | 18 | 19 | 20 | 21 | 22 | 23 | 24 | 25 | 26 | 27 |
|---|---|---|---|---|---|---|---|---|---|---|---|---|
| Diene rubber | (1) | 100 | — | — | 100 | 100 | 100 | 100 | 100 | 100 | 100 | 100 |
| | (2) | — | 100 | — | — | — | — | — | — | — | — | — |
| | (3) | — | — | 100 | — | — | — | — | — | — | — | — |
| Liquid diene polymer | (5) | — | — | — | 65.3 | — | — | 7.3 | 57.3 | — | — | — |
| | (4) | — | — | — | — | 29 | — | — | — | — | — | — |
| | (6) | — | — | — | — | — | 29 | — | — | — | — | — |
| Organopolysiloxane | (8) | — | — | — | — | — | — | 20 | — | — | — | — |
| | (10) | — | — | — | — | — | — | — | — | — | 20 | — |
| Fluoropolymer | (20) | — | — | — | 45 | 20 | 20 | — | — | 20 | — | — |
| | (22) | — | — | — | — | — | — | — | — | — | — | 20 |
| | (19) | — | — | — | — | — | — | — | 20 | — | — | — |
| Catalyst | (28) | — | — | — | 0.45 | 0.2 | — | 0.2 | 0.2 | — | — | — |

TABLE 17

| Material | | Comparative example 17 | 18 | 19 | 20 | 21 | 22 | 23 | 24 | 25 | 26 | 27 |
|---|---|---|---|---|---|---|---|---|---|---|---|---|
| Filler | (29) | 40 | — | 30 | 40 | 40 | 40 | 40 | 40 | 40 | 40 | 40 |
| | (30) | — | — | 30 | — | — | — | — | — | — | — | — |
| | (31) | — | 30 | — | — | — | — | — | — | — | — | — |
| | (32) | — | — | 4 | — | — | — | — | — | — | — | — |
| | (33) | 35 | — | — | 35 | 35 | 35 | 35 | 35 | 35 | 35 | 35 |
| | (34) | — | 50 | — | — | — | — | — | — | — | — | — |
| | (35) | — | 50 | — | — | — | — | — | — | — | — | — |
| Vulcanizer | (36) | 0.3 | 1.8 | — | 0.3 | 0.3 | 0.3 | 0.3 | 0.3 | 0.3 | 0.3 | 0.3 |
| Vulcanization assistant | (37) | 5 | 5 | 5 | 5 | 5 | 5 | 5 | 5 | 5 | 5 | 5 |
| | (38) | 1 | 1 | 1 | 1 | 1 | 1 | 1 | 1 | 1 | 1 | 1 |
| Vulcanization accelerator | (39) | 2 | 1.3 | 1 | 2 | 2 | 2 | 2 | 2 | 2 | 2 | 2 |
| | (40) | 2 | 0.5 | — | 2 | 2 | 2 | 2 | 2 | 2 | 2 | 2 |
| Plasticizer | (41) | 7 | 30 | 20 | 7 | 7 | 7 | 7 | 7 | 7 | 7 | 7 |
| Age resistor | (42) | 1.5 | 1.5 | 2 | 1.5 | 1.5 | 1.5 | 1.5 | 1.5 | 1.5 | 1.5 | 1.5 |
| | (43) | — | — | 2.5 | — | — | — | — | — | — | — | — |

TABLE 18

| Measuring item | Comparative example 17 | 18 | 19 | 20 | 21 | 22 | 23 | 24 | 25 | 26 | 27 |
|---|---|---|---|---|---|---|---|---|---|---|---|
| Tensile break strength (kg/cm) | 190 | 90 | 135 | 90 | 105 | 100 | 175 | 135 | 145 | 95 | 95 |
| Tensile break | 505 | 620 | 355 | 285 | 290 | 280 | 455 | 380 | 425 | 335 | 340 |

TABLE 18-continued

| Measuring | Comparative example | | | | | | | | | | |
|---|---|---|---|---|---|---|---|---|---|---|---|
| item | 17 | 18 | 19 | 20 | 21 | 22 | 23 | 24 | 25 | 26 | 27 |
| elongation (%) | | | | | | | | | | | |
| Hardness (JIS-A) | 68 | 50 | 70 | 61 | 62 | 62 | 62 | 63 | 63 | 61 | 63 |
| Friction coefficient | 1.30 | 1.48 | 1.25 | 0.79 | 1.05 | 1.04 | 1.26 | 1.21 | 1.20 | 0.86 | 0.75 |

TABLE 19

| Material | | Example | | | | | | | | | | |
|---|---|---|---|---|---|---|---|---|---|---|---|---|
| | | 31 | 32 | 33 | 34 | 35 | 36 | 37 | 38 | 39 | 40 | 41 |
| Diene rubber | (1) | 100 | 100 | 100 | 100 | — | — | 100 | 100 | 100 | 100 | 100 |
| | (2) | — | — | — | — | 100 | — | — | — | — | — | — |
| | (3) | — | — | — | — | — | 100 | — | — | — | — | — |
| Liquid diene polymer | (4) | 3.8 | 24.6 | 23.3 | 12.5 | 12.5 | 12.5 | 12.5 | 53.9 | 52.1 | 50 | 25 |
| Isocyanate compound | (44) | 0.3 | 1.7 | 1.7 | 0.9 | 0.9 | 0.9 | 0.9 | 3.9 | 3.8 | 3.7 | 1.8 |
| Organopoly-siloxane | (12) | — | 10 | — | — | — | — | — | — | — | — | — |
| | (13) | — | — | 10 | — | — | — | — | — | — | — | — |
| Fluoropolymer | (20) | 3 | — | — | 10 | 10 | 10 | — | — | — | 40 | 10 |
| | (21) | — | — | — | — | — | — | 10 | — | — | — | — |
| | (23) | — | — | — | — | — | — | — | 10 | — | — | — |
| | (24) | — | — | — | — | — | — | — | — | 10 | — | — |
| Polyol | (25) | — | 1 | 1 | — | — | — | — | — | — | — | — |
| Catalyst | (26) | 0.03 | 0.1 | 0.1 | 0.1 | 0.1 | 0.1 | 0.1 | 0.1 | 0.1 | 0.4 | 0.1 |

TABLE 20

| Material | | Example | | | | | | | | | | |
|---|---|---|---|---|---|---|---|---|---|---|---|---|
| | | 31 | 32 | 33 | 34 | 35 | 36 | 37 | 38 | 39 | 40 | 41 |
| Filler | (29) | 40 | 40 | 40 | 40 | — | 30 | 40 | 40 | 40 | 40 | 40 |
| | (30) | — | — | — | — | — | 30 | — | — | — | — | — |
| | (31) | — | — | — | — | 30 | — | — | — | — | — | — |
| | (32) | — | — | — | — | — | 4 | — | — | — | — | — |
| | (33) | 35 | 35 | 35 | 35 | — | — | 35 | 35 | 35 | 35 | 35 |
| | (34) | — | — | — | — | 50 | — | — | — | — | — | — |
| | (35) | — | — | — | — | 50 | — | — | — | — | — | — |
| Vulcanizer | (36) | 0.3 | 0.3 | 0.3 | 0.3 | 1.8 | — | 0.3 | 0.3 | 0.3 | 0.3 | 0.3 |
| Vulcanization assistant | (37) | 5 | 5 | 5 | 5 | 5 | 5 | 5 | 5 | 5 | 5 | 5 |
| | (38) | 1 | 1 | 1 | 1 | 1 | 1 | 1 | 1 | 1 | 1 | 1 |
| Vulcanization accelerator | (39) | 2 | 2 | 2 | 2 | 1.3 | 1 | 2 | 2 | 2 | 2 | 2 |
| | (40) | 2 | 2 | 2 | 2 | 0.5 | — | 2 | 2 | 2 | 2 | 2 |
| Plasticizer | (41) | 7 | 7 | 7 | 7 | 30 | 20 | 7 | 7 | 7 | 7 | 7 |
| Age resistor | (42) | 1.5 | 1.5 | 1.5 | 1.5 | 1.5 | 2 | 1.5 | 1.5 | 1.5 | 1.5 | 1.5 |
| | (43) | — | — | — | — | — | 2.5 | — | — | — | — | — |

TABLE 21

| Measuring | Example | | | | | | | | | | |
|---|---|---|---|---|---|---|---|---|---|---|---|
| item | 31 | 32 | 33 | | 35 | 36 | 37 | 38 | 39 | 40 | 41 |
| Tensile break strength (kg/cm$^2$) | 190 | 175 | 170 | 170 | 85 | 125 | 170 | 160 | 165 | 150 | 160 |
| Tensile break elongation (%) | 505 | 460 | 440 | 465 | 600 | 330 | 445 | 435 | 445 | 400 | 440 |
| Hardness (JIS-A) | 68 | 68 | 68 | 68 | 50 | 68 | 68 | 68 | 67 | 65 | 67 |
| Friction coefficient | 0.85 | 0.74 | 0.75 | 0.52 | 0.72 | 0.69 | 0.66 | 0.76 | 0.85 | 0.50 | 0.62 |

TABLE 22

| Material | | Comparative example | | | | | | | | |
|---|---|---|---|---|---|---|---|---|---|---|
| | | 28 | 29 | 30 | 31 | 32 | 33 | 34 | 35 | 36 |
| Diene rubber | (1) | 100 | — | — | 100 | 100 | 100 | 100 | 100 | 100 |
| | (2) | — | 100 | — | — | — | — | — | — | — |
| | (3) | — | — | 100 | — | — | — | — | — | — |
| Liquid diene polymer | (4) | — | — | — | 62.5 | 12.5 | 12.5 | — | — | — |
| | (6) | — | — | — | — | — | — | 12.5 | — | — |
| Isocyanate compound | (44) | — | — | — | 4.6 | 0.9 | 0.9 | 0.9 | — | — |
| Organopoly-siloxane | (12) | — | — | — | — | — | — | — | 10 | — |
| | (10) | — | — | — | — | 10 | — | — | — | — |

TABLE 22-continued

| Material | | Comparative example | | | | | | | | |
|---|---|---|---|---|---|---|---|---|---|---|
| | | 28 | 29 | 30 | 31 | 32 | 33 | 34 | 35 | 36 |
| Fluoropolymer | (20) | — | — | — | 50 | — | — | 10 | — | 10 |
| | (22) | — | — | — | — | — | 10 | — | — | — |
| Catalyst | (26) | — | — | — | 0.5 | 0.1 | 0.1 | 0.1 | — | — |

TABLE 23

| Material | | Comparative example | | | | | | | | |
|---|---|---|---|---|---|---|---|---|---|---|
| | | 28 | 29 | 30 | 31 | 32 | 33 | 34 | 35 | 36 |
| Filler | (29) | 40 | — | 30 | 40 | 40 | 40 | 40 | 40 | 40 |
| | (30) | — | — | 30 | — | — | — | — | — | — |
| | (31) | — | 30 | — | — | — | — | — | — | — |
| | (32) | — | — | 4 | — | — | — | — | — | — |
| | (33) | 35 | — | — | 35 | 35 | 35 | 35 | 35 | 35 |
| | (34) | — | 50 | — | — | — | — | — | — | — |
| | (35) | — | 50 | — | — | — | — | — | — | — |
| Vulcanizer | (36) | 0.3 | 1.8 | — | 0.3 | 0.3 | 0.3 | 0.3 | 0.3 | 0.3 |
| Vulcanization assistant | (37) | 5 | 5 | 5 | 5 | 5 | 5 | 5 | 5 | 5 |
| | (38) | 1 | 1 | 1 | 1 | 1 | 1 | 1 | 1 | 1 |
| Vulcanization accelerator | (39) | 2 | 1.3 | 1 | 2 | 2 | 2 | 2 | 2 | 2 |
| | (40) | 2 | 0.5 | — | 2 | 2 | 2 | 2 | 2 | 2 |
| Plasticizer | (41) | 7 | 30 | 20 | 7 | 7 | 7 | 7 | 7 | 7 |
| Age resistor | (42) | 1.5 | 1.5 | 2 | 1.5 | 1.5 | 1.5 | 1.5 | 1.5 | 1.5 |
| | (43) | — | — | 2.5 | — | — | — | — | — | — |

TABLE 24

| Material | Comparative example | | | | | | | | |
|---|---|---|---|---|---|---|---|---|---|
| | 28 | 29 | 30 | 31 | 32 | 33 | 34 | 35 | 36 |
| Tensile break strength (kg/cm$^2$) | 190 | 90 | 135 | 90 | 95 | 95 | 100 | 140 | 140 |
| Tensile break elongation (%) | 505 | 620 | 355 | 280 | 330 | 335 | 285 | 420 | 435 |
| Hardness (JIS-A) | 68 | 50 | 70 | 60 | 61 | 63 | 62 | 63 | 63 |
| Friction coefficient | 1.30 | 1.48 | 1.25 | 0.74 | 0.87 | 0.72 | 1.00 | 1.15 | 1.05 |

What is claimed is:

1. A lubricating rubber composition comprising:
   a diene rubber; and
   a fluoropolymer having at least one group selected from the group consisting of isocyanate group and cyanate group wherein said fluoropolymer is present in 3–100 parts by weight per 100 parts by weight of diene rubber.

2. A lubricating rubber composition as claimed in claim 1, further comprising a liquid diene polymer having a hydroxy group wherein the sum of contents of said liquid diene polymer and said fluoropolymer is 5 to 100 parts by weight per 100 parts by weight of the diene rubber.

3. A lubricating rubber composition comprising:
   a diene rubber;
   a liquid diene polymer having a unit having an epoxy group; and
   a fluoropolymer having a unit having at least one group selected from the group consisting of amino, carboxyl, hydroxy and mercapto groups wherein said fluoropolymer is present in 3–100 parts by weight per 100 parts by weight of diene rubber and the sum of contents of said liquid diene polymer and said fluoropolymer is 5 to 100 parts by weight per 100 parts by weight of the diene rubber.

4. A lubricating rubber composition as claimed in claim 3, wherein said liquid diene polymer is a polymer prepared by polymerizing or co-polymerizing a diene monomer, having a molecular weight of 500–50000 and having said epoxy group at end thereof, having an epoxy equivalent amount of 100–50000, and being in a liquid form at normal temperature.

5. A lubricating rubber composition as claimed in claim 3, wherein said fluoropolymer is prepared by adding at least one selected from the group consisting of amino, carboxyl, hydroxy and mercapto groups into a polyfluoroalkyl.

6. A lubricating rubber composition as claimed in claim 3, wherein said fluoropolymer is prepared by adding at least one selected from the group consisting of amino, carboxyl hydroxy and mercapto groups into a polyfluoroether.

7. A lubricating rubber composition as claimed in claim 3, wherein the sum of contents of said liquid diene polymer and fluoropolymer is 5 to 10 parts by weight with respect to 100 parts by weight of said diene rubber 8. A lubricating rubber composition comprising:
   a diene rubber;
   a liquid diene polymer having at least two units each having a hydoxy group in one molecule;
   an isocyanate compound having at least two units each having an isocyanate group in one molecule; and
   a fluoropolymer having a unit containing at least one group selected from the group consisting of amino, carboxyl, hydroxy and mercapto groups wherein said fluoropolymer is present in 3–100 parts by weight per 100 parts by weight of diene rubber and the sum of contents of said liquid diene polymer and said fluoropolymer is 5 to 100 parts by weight per 100 parts by weight of the diene rubber.

* * * * *